United States Patent [19]

Botsolas

[11] Patent Number: 5,158,114
[45] Date of Patent: Oct. 27, 1992

[54] SPECIALIZED PIPEFITTING COVER FOR INSULATED Y-SHAPED JOINT

[75] Inventor: Chris J. Botsolas, St. Petersburg, Fla.

[73] Assignee: Carol M. Botsolas, St. Petersburg, Fla.

[21] Appl. No.: 185,137

[22] Filed: Apr. 22, 1988

Related U.S. Application Data

[63] Continuation-in-part of Ser. No. 123,589, Nov. 20, 1987, Pat. No. 4,830,060.

[51] Int. Cl.⁵ .................. F16L 59/02; F16K 51/00
[52] U.S. Cl. ................. 138/149; 138/110; 138/157; 138/158; 137/375
[58] Field of Search ............ 138/89, 99, 97, 110, 138/149, 177, 178, 157, 158, 151, 162; 137/375; 285/45, 155, 156

[56] References Cited

U.S. PATENT DOCUMENTS

| | | | |
|---|---|---|---|
| 2,686,631 | 6/1954 | Smith | 138/99 |
| 2,756,172 | 7/1956 | Kidd . | |
| 3,307,590 | 3/1967 | Carlson | 138/149 |
| 3,367,358 | 2/1968 | Rentschler | 138/149 |
| 3,432,188 | 3/1969 | Turner | 138/99 |
| 3,443,599 | 5/1969 | Klein . | |
| 3,495,629 | 2/1970 | Botsolas et al. . | |
| 3,560,287 | 2/1971 | Helling . | |
| 3,732,894 | 5/1973 | Botsolas . | |
| 3,960,181 | 6/1976 | Baur et al. . | |
| 4,139,026 | 2/1979 | Zack . | |
| 4,449,554 | 5/1984 | Busse | 138/163 |
| 4,553,308 | 11/1985 | Botsolas . | |
| 4,627,995 | 12/1986 | Botsolas . | |
| 4,669,509 | 6/1987 | Botsolas . | |

FOREIGN PATENT DOCUMENTS

| | | | |
|---|---|---|---|
| 906980 | 8/1972 | Canada | 137/375 |
| 1220515 | 1/1971 | United Kingdom | 138/89 |

Primary Examiner—James E. Bryant, III
Attorney, Agent, or Firm—Hedman, Gibson & Costigan

[57] ABSTRACT

A pipefitting cover specially designed to enclose an insulated Y-shaped joint is disclosed comprising two half sections, where one half section is adapted to interlock with the other half section while accommodating an additional pipe segment protruding at an angle from the first straight pipe segment.

14 Claims, 3 Drawing Sheets

SPECIALIZED PIPEFITTING COVER FOR INSULATED Y-SHAPED JOINT

CROSS REFERENCE TO RELATED APPLICATION

This application is a continuation-in-part application of Ser. No. 123,589, filed on Nov. 20, 1987, now U.S. Pat. No. 4,830,060.

FIELD OF THE INVENTION

The present invention is directed to a novel cover for covering an angled pipe joint, and more particularly to a specialized pipefitting cover adapted to snugly enclose an insulated, generally Y-shaped pipe joint.

BACKGROUND OF THE INVENTION

It is desirable in the insulation industry to be able to install insulation not only on straight pipes but on specialized segments such as elbows, T's, valves, flanges, S bends, Y-branches, strainers, unions, and various other fittings. While flexible insulation is known which can be wrapped about such specialized fittings, pipefitting covers have been developed to enclose such insulation, in order to surround and protect the insulation, e.g., from tears, water, spills, etc., and to present a neat, aesthetically pleasing covered fixture.

Improvements in pipefitting covers are described in several patents, e.g., U.S. Pat. Nos. 3,495,629, 3,732,894, 4,553,308, and 4,669,509, all of which are incorporated herein by reference, in which a variety of pipefittings have been provided with standardized one or two-piece protective and attractive covers. U.S. Pat. No. 3,732,894, for example, provides a pipefitting cover for a T joint made of two T-shaped halves, pivotally connected by a rivet or screw, which fit over and enclose a T-shaped pipefitting covered by insulation.

Although specialized covers for many types of pipefittings are known, there remains a need for an attractive pipefitting cover for Y-shaped joints, such as strainers having a "dirt leg", wherein a straight segment of pipe is connected to a second pipe (or dirt leg) which diverges from the first pipe at an angle.

SUMMARY OF THE INVENTION

Accordingly, it is an object of the present invention to provide an efficient pipefitting cover for insulated Y-shaped joints.

It is a further object of the present invention to provide a single fitting cover which is easily fabricated from a variety of materials and easily installed over a pipe-fitting.

It is a further object of the present invention to provide a single fitting cover having the capacity to cover a variety of Y-shaped fittings and accommodate various diameters of insulated pipe extending from the same fitting.

These and other objects are attained herein by a pipe-fitting cover which, in essence, is formed of two half sections, one fitting the contour of a straight pipe segment and the other interlocking with the first half section to enclose a straight pipe segment while also accommodating and enclosing an additional pipe segment branching from the first straight pipe segment, said half sections, when joined, forming an integral covering for the Y-shaped joint and any insulation surrounding it.

In practice, the cover of the present invention can be installed over a large range of insulation thicknesses and pipe thicknesses by virtue of its inherent design. The pipe-fitting covers of the present invention are also easily assembled, easily customized to the particular gauge of pipe connected to the Y-shaped joint, and efficiently secured in place by a variety of means.

DESCRIPTION OF THE DRAWINGS

The accompanying drawings, referred to herein and constituting a part hereof, illustrate preferred embodiments of the invention and, together with the description, serve to explain the principles of this invention.

DESCRIPTION OF THE PREFERRED EMBODIMENT

The present invention is suitable for use in any piping installation where angular protrusions from a straight pipe occur.

Figure 1:
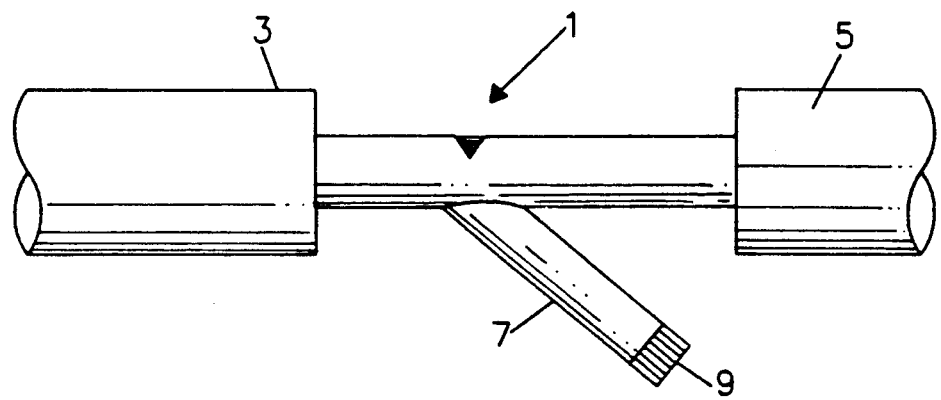
FIG. 1 is an elevational view of a strainer joint with a dirt leg nipple, with insulated and covered incoming and outgoing pipes.

As best seen in FIG. 1, a generally Y-shaped pipefitting such the strainer (1) presents an unwieldy configuration for the installation of insulation and the covering of said insulation. Straight pipe sections (3) and (5) are easily insulated and covered with conventional materials and piping, but a "dirt leg" (7) jutting out from the straight section of the strainer (1) makes insulation by conventional means impossible.

In operation, the strainer (1) serves to remove suspended debris from water or other fluids conducted from the incoming pipe segment (3) through the strainer to the outgoing pipe segment (5). The fluid enters the strainer from the incoming pipe segment (3) and passes through a screen strainer within the joint (not shown). Particulate matter strained from the fluid falls into the dirt leg (7) and accumulates there until it is flushed through the nozzle (9). Filtered fluid continues through the strainer (1) to the outgoing pipe (5).

Figure 2:
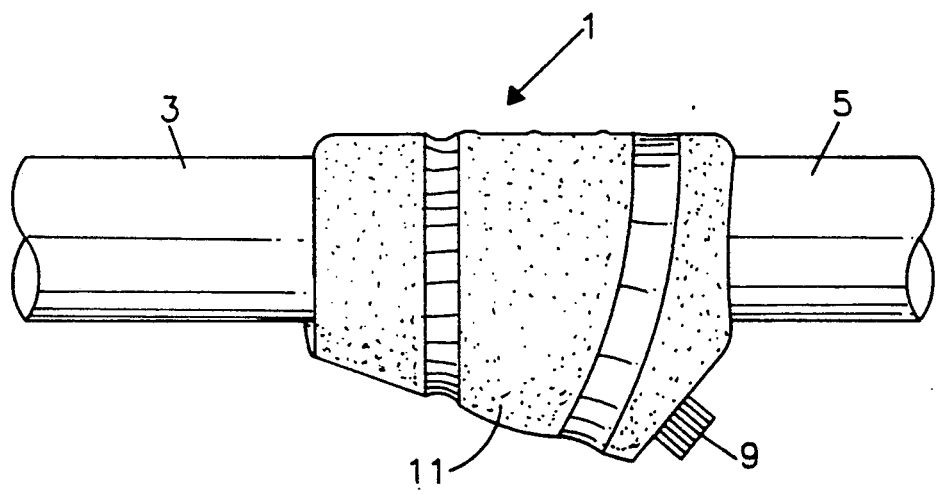
FIG. 2 is an elevational view of the same strainer, wherein the joint has been covered with flexible insulation.

FIG. 2 shows the strainer (1) of FIG. 1 wrapped in blanket insulation (11) the makeshift installation of the insulation about the strainer leaves the insulation exposed to machinery, chemicals and other elements which could damage the insulation or decrease its insulating efficiency. The exposed insulation also does not present a very neat or aesthetically pleasing appearance.

Figure 3:
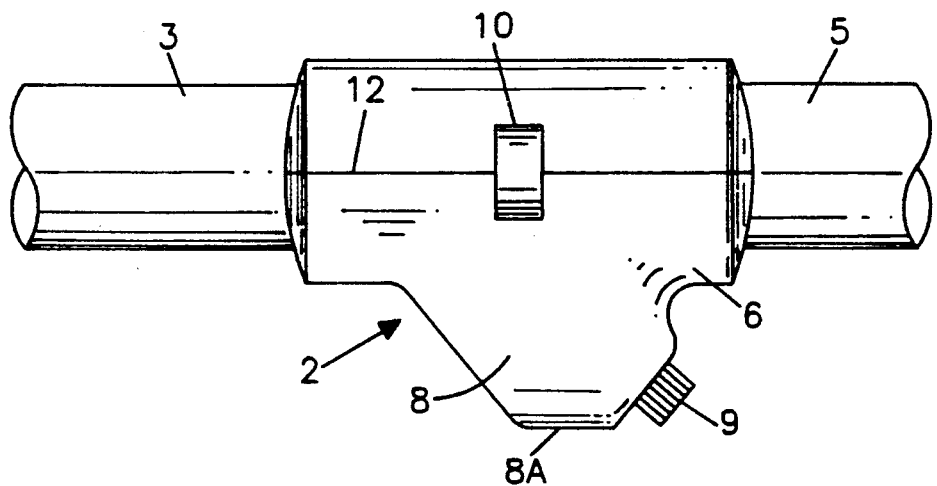
FIG. 3 is an elevational view of the same strainer, with the pipefitting cover of the present invention installed over the insulated joint.

In FIG. 3, the insulation-wrapped strainer (1) of FIG. 2 has been encased in a specialized pipefitting cover (2) in accordance with the present invention. The pipefitting cover (2) is formed from two half sections (4) and (6) which are sized to snugly interlock and overlap along their edges (12), completely enclosing the insulated strainer.

The first half section (4) has a generally elongated trough shape, which conforms (when arcuate cuts are made in either end) to the shape of the straight pipe sections (3) and (5). Customizing the pipefitting cover (2) to fit the given straight pipe sections by means of arcuate cuts in the ends of the trough-shaped bodies of the half sections (4) and (6) is better understood from FIGS. 4 and 5, discussed infra.

The second half section (6) has a trough-shaped body sized to interlockingly join with the first half section (4), however it is also provided with a protrusion (8) which accommodates the insulated dirt leg of the strainer. The protrusion (8) ends with a flat closure face (16 in FIG. 4), and a hole is punched through said face (16) to allow the nozzle (9) to penetrate. Various types of valves or an end cap (not shown) may be installed at the end of the dirt leg as required by the practitioner.

As seen in FIG. 3, the protrusion (8) tapers at the end immediately adjacent the flat closure face (16 in FIG. 4) in a frusto-conical configuration. This provides a flat edge (8A) parallel to the longitudinal axis of the pipe-fitting cover (2) which reduces the overall height of the pipefitting cover and permits installation of the cover where clearance is a problem, for example, where the strainer is installed in a fluid-carrying pipe that runs close to a wall or close to other piping.

The two half sections (4) and (6) of the pipe-fitting cover shown in FIG. 3 are joined to form a unitary whole (2) and are secured together with adhesive tape (10). A wide variety of other closures (not shown) such as tacks, rivets, screws, cements, tab locks, and the like may optionally be employed, again to fit the requirements of the practitioner. For example, in applications where the pipe-fitting cover may be installed as a permanent fixture, adhesives or cements are preferably used to secure the two half sections together, and the entire cover can be caulked at all edges and seams, e.g., with silicone caulking, especially where the pipe fitting is to be installed outdoors and subsequently exposed to the elements.

Figure 4:
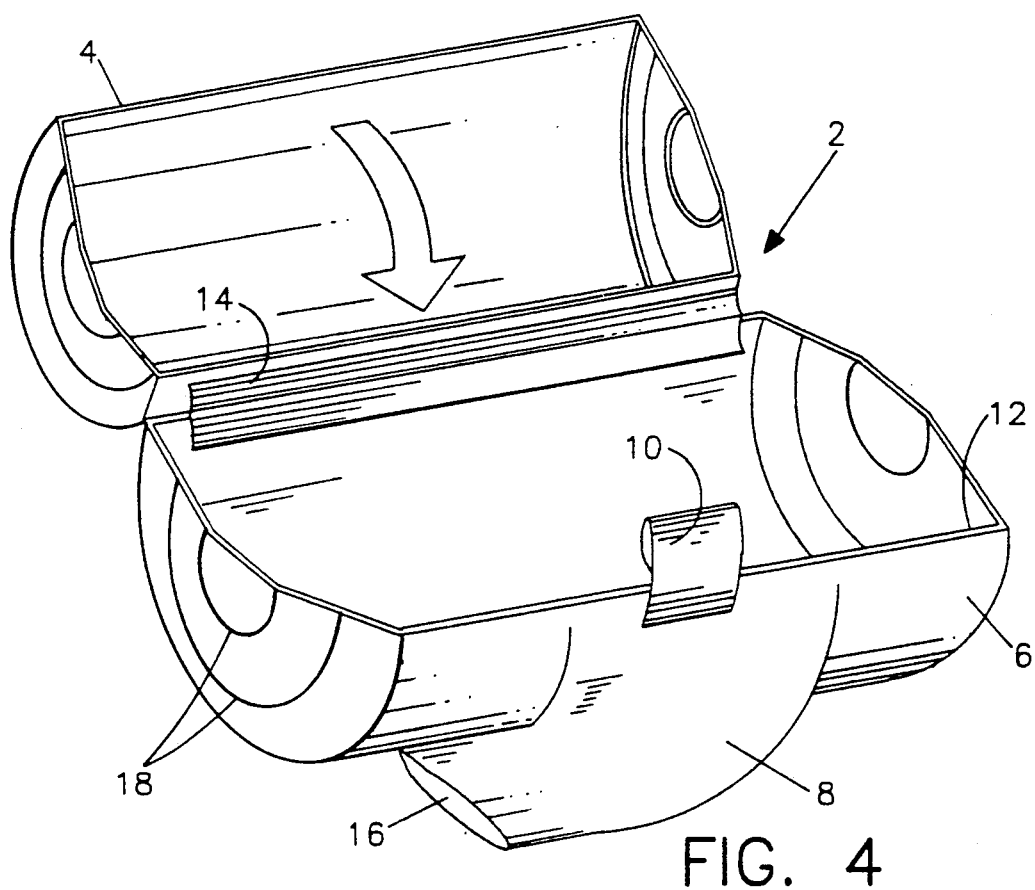
FIG. 4 is a perspective view of the two half sections of the pipefitting cover of the present invention, shown connected in a clamshell configuration.

As seen in FIG. 4, the two half sections (4) and (6) of the pipefitting cover (2) of the invention are sized to interlockingly fit together, overlapping at the edges (12), to form an integral, attractive cover. In applications where frequent removal and re-installation of the cover may be required, the two sections (4) and (6) are preferably hingingly connected to afford a clamshell configuration. In FIG. 4, the half sections (4) and (6) are joined by adhesive tape (14), holding together two mated edges. Other types of hinges, familiar to persons in the art, may, of course, be alternatively employed.

In the embodiment of FIG. 4, half section (4) is dimensioned slightly smaller than half section (6). Thus, the edges on each end and the longitudinal edge of half section (4) fit within the respective ends and longitudinal edge (12) of half section (6). At the ends of the trough-shaped bodies of the half sections (4) and (6), arcuate cuts are made, of a radius which will provide a circular opening of appropriate diameter at either end of the fully assembled pipefitting cover (2), i.e., when the two half sections (4) and (6) are closed together. Preferably, arcuate markings (18) will be provided at the ends corresponding to radii of standard pipe diameters with which the pipefitting cover of the invention will be used. In fabricating the halves of the pipefitting cover, the markings (18) can be made in the form of scored or embossed grooves, or perforated grooves, to guide the practitioner in making accurate cuts or to allow arcuate sections to be snipped and stripped out by hand. The same type of scorings or perforated circles may be made in the flat closure face (16), in order to facilitate the formation of an appropriately sized opening, e.g., to allow penetration of the dirt leg nozzle (9 in FIG. 3). The markings (18) will have a depth of between about 0.005" to 0.015" from the reverse side of the original thickness of the material used. This will permit a starting snip and pull tab method of stripping the circle to form the desired opening.

Figure 5:
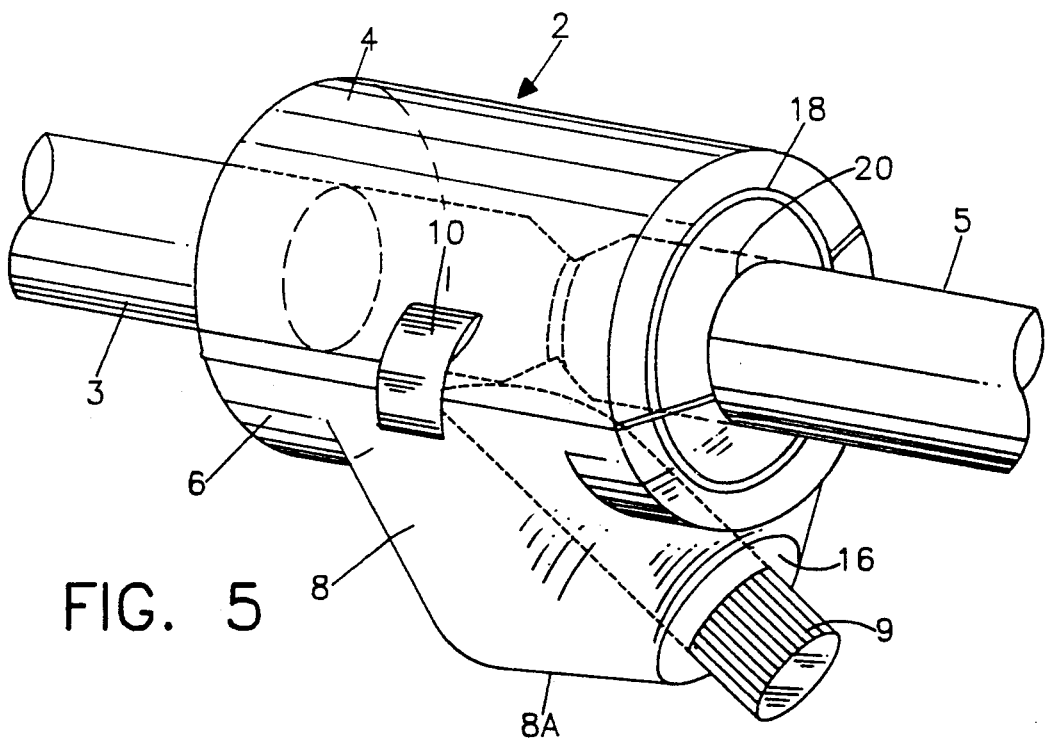
FIG. 5 is a perspective view of the assembled and closed pipefitting cover of the invention about a strainer with a dirt leg nipple.

The fully assembled pipefitting cover (2) is seen in FIG. 5. The strainer encompassed by the pipefitting cover is depicted in dotted lines. The two half sections (4) and (6) are shown in closed, interlocked position and fixed together by a tape closure (10). An incoming pipe (3) is shown entering one end of the pipefitting cover (2) and an outgoing pipe (5) is shown extending from the opposite end of the pipefitting cover. A hole has been cut in the flat closure face (16) of the protrusion (8) to permit penetration and exposure of the dirt leg nozzle (9). Scored grooves (18) are seen at the ends of the trough-shaped bodies (4) and (6), and, following such scored grooves, an acruate cut (20) has been made in each half section to perfectly accommodate the precise circumference of the incoming and outgoing pipes (3) and (5).

Figure 6:
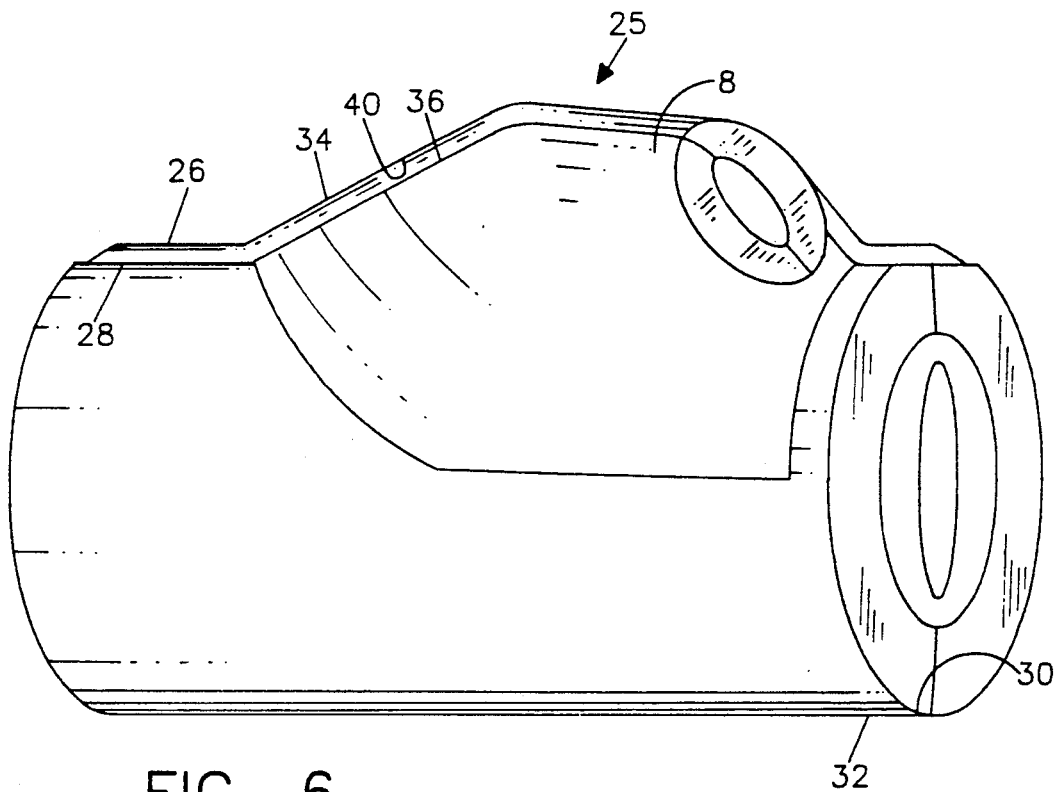
FIG. 6 is a side elevational view of the pipe-fitting cover of the present invention adapted for installation over a larger size strainer joint.
Figure 7:
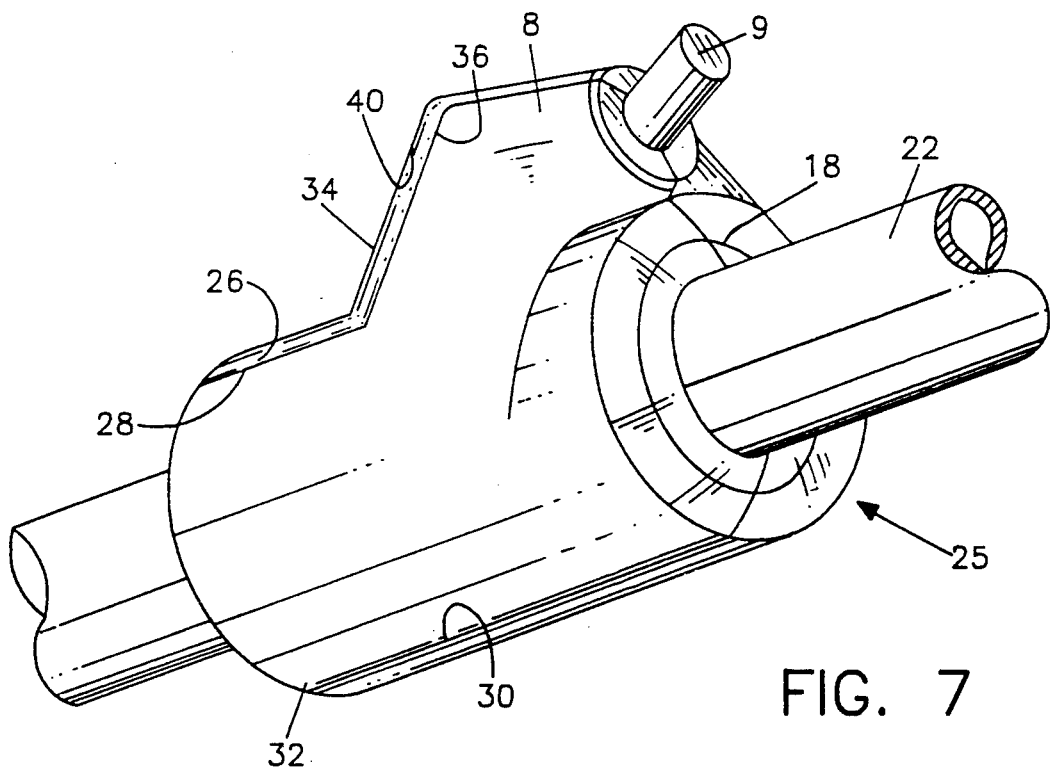
FIG. 7 is a perspective view of the pipefitting cover of FIG. 6 installed about a larger strainer joint.

FIGS. 6 and 7 depict a pipefitting cover (25) adapted for use over a larger strainer joint (22) formed from two half sections (26) and (28) which are identical left and right hand sections in shape and sized to snugly interlock, completely enclosing the strainer (22). The two half sections (26) and (28) are adapted to conform to a straight pipe segment and an identical pipe segment protruding from said straight pipe at an angle.

The two half sections (26) and (28) have generally troughshaped bodies with a protrusion (8) to accommodate an insulated dirt leg nozzle (9). Said half sections (26) and (28) have a hinged edge (30) and (32) which when joined are held together by adhesive tape (not shown). In addition, said half sections (26) and (28) have overlapping edges (34) and (36) which meet at a point around the dirt leg nozzle (9). The overlapping edges (34) and (36) of the two half sections (26) and (28), when joined together, form overlapping joint (40) which is 180° away in the same plane from the joined hinged edges (30) and (32) of the two half sections (26) and (28).

As here preferably embodied, the pipefitting cover (2) is constructed of a material having sufficient flexibility and resiliency to afford limited bending under stress while maintaining the pre-formed shape of each half section when no stress is applied. Suitable construction materials affording limited flexibility, dimensional stability, and desirable impact strength, as well as providing a smooth, attractive surface, include vinyl resins, in particular polyvinyl chloride, formable sheet metals, superplastic metals, and generally any engineering thermoplastic known in the art and adaptable to such purposes. Alternatively, the pipefitting cover may be pressed or drawn to form from a metal foil, such as aluminum foil, and then coated with a plastic such as sprayed polyurethane, polyester, epoxy resin, vinyl resin, silicone resin or a molten thermoplastic, such as polyethylene. Preferably, the pipefitting cover will be thermoformed from polyvinyl chloride or from superplastic metals or metal alloys, such as SPZ® alloy manufactured by ISC Alloys Ltd., containing zinc and some 20% aluminum, or drawn from aluminum or other metal.

In accordance with the foregoing disclosure, specialized pipefitting covers may be fabricated to accommodate an infinite variety of generally Y-shaped joints having a straight pipe section and an additional pipe section protruding therefrom at an angle. The preferred embodiments described herein are particularly suitable for enclosing insulation-wrapped standard strainer joints having a dirt leg protruding at an angle of about 45°. However, it will be understood that the half sections of the pipefitting cover of this invention may be sized to accommodate any size or configuration of generally Y-shaped joint, and sized to accommodate such joints covered by any of a wide array of insulating materials or multiple layers of such insulating materials.

The invention in its broader aspects is not limited to the specific embodiments described above and in the accompanying drawings, and departures may be made from the specific embodiments which are within the scope of the appended claims without departing from the principles of the invention and without sacrificing its chief advantages.

I claim:

1. A specialized pipefitting cover for an insulated, Y-shaped joint having a straight pipe segment and an additional pipe protruding from the straight pipe segment comprising:

two half sections including a first section having an elongated trough-shaped body adapted to conform to the straight pipe segment and a second section having an elongated trough-shaped body adapted to conform to the straight pipe segment and also having means to accommodate the additional pipe segment protruding from said straight pipe segment at an angle, said half sections being further shaped so that when positioned together in opposed relationship, they form the shape of the Y-shaped joint to be covered, each of said half sections having edge portions permitting overlap of the edges when said sections are in a position of opposed relationship, said sections being further sized so that said edges of one section overlap and fit snugly inside the edges of the other section, creating a closed pipefitting cover and each of said half sections having two opposite ends with openings configured in said ends, which openings closely conform to said straight pipe segments when said half sections are positioned together in opposed relationships, and said means to accommodate an additional pipe segment comprising a generally cylindrical protrusion from the body of said second section, the protrusion extending from the body of the second section for a length at substantially the same angle as said additional pipe segment to be covered and ending with a flat closure face substantially perpendicular to said angle.

2. A pipefitting cover according to claim 1, which further comprises means for hingingly connecting said half sections so as to create a unitary pipefitting cover with the half sections fixed in an opposed clamshell relationship.

3. A pipefitting cover according to claim 2, wherein said means consists of a length of adhesive tape securing respective overlapping edges of the two half sections.

4. A pipefitting cover according to claim 3, wherein the tape is applied to the inside of the overlapping edges, so as to be enclosed in the cover when installed about the Y-shaped joint to be covered.

5. A pipefitting cover according to claim 4, wherein the overlapping edges of the two half sections opposite the hinged edges are secured together by locking means selected from the group consisting of tape, cement, tacks, rivets, screws, tab locks, and elastic bands.

6. A pipefitting cover according to claim 1 wherein the angle between said straight pipe segment and additional pipe segment is between about 30° to 45°.

7. A pipefitting cover according to claim 1, wherein the angle formed by the protrusion to the body of the second section is about 45°.

8. A pipefitting cover according to claim 1, made from the group comprising thermoformed plastic and superplastic metal.

9. A pipefitting cover according to claim 8, made from a thermoplastic vinyl resin.

10. A pipefitting cover according to claim 9, made from polyvinyl chloride.

11. A pipefitting cover according to claim 8, made from a superplastic alloy of zinc and aluminum.

12. A pipefitting cover according to claim 1, wherein the inside surfaces of said two half sections are covered with insulating material.

13. A pipefitting cover according to claim 1, formed from pressed aluminum foil coated with a plastic selected from the group consisting of polyurethane, polyester, epoxy resin, vinyl resin, silicone resin, or polyethylene.

14. A pipefitting cover according to claim 1 made from the group comprising aluminum sheet metal and other formable sheet metal.

* * * * *